US011236813B2

(12) United States Patent
Nishiyabu et al.

(10) Patent No.: US 11,236,813 B2
(45) Date of Patent: Feb. 1, 2022

(54) STRADDLE VEHICLE

(71) Applicant: KAWASAKI JUKOGYO KABUSHIKI KAISHA, Kobe (JP)

(72) Inventors: Masaki Nishiyabu, Akashi (JP); Yuji Hida, Akashi (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

(21) Appl. No.: 16/916,560

(22) Filed: Jun. 30, 2020

(65) Prior Publication Data

US 2021/0003210 A1    Jan. 7, 2021

(30) Foreign Application Priority Data

Jul. 2, 2019    (JP) .............................. JP2019-123351

(51) Int. Cl.
*F16H 1/46*    (2006.01)
*B60K 17/16*    (2006.01)
*F16H 57/04*    (2010.01)

(52) U.S. Cl.
CPC ..... *F16H 57/0473* (2013.01); *F16H 57/0404* (2013.01); *F16H 57/0435* (2013.01); *F16H 57/0436* (2013.01); *F16H 57/0441* (2013.01); *F16H 57/0452* (2013.01)

(58) Field of Classification Search
CPC ............. F16H 57/0473; F16H 57/0452; F16H 57/0441; F16H 57/0435; F16H 57/0404; F16H 57/0436
See application file for complete search history.

(56) References Cited

U.S. PATENT DOCUMENTS

| 4,626,344 | A  | * | 12/1986 | Fick ................... B01D 35/147 210/90 |
| 10,113,518 | B2 | * | 10/2018 | Arai ...................... F02M 35/02 |
| 10,233,853 | B2 | * | 3/2019 | Muramatsu ........... F01N 11/007 |
| 10,400,834 | B2 | * | 9/2019 | Sugiura .................... F01M 1/02 |
| 2004/0245050 | A1 | * | 12/2004 | Kawamoto .............. F01M 1/12 184/6.5 |
| 2009/0084633 | A1 |   | 4/2009  | Fujimoto et al. |
| 2009/0247361 | A1 | * | 10/2009 | Maehara ............. F16H 57/0405 477/155 |
| 2014/0322057 | A1 | * | 10/2014 | Ogata ..................... F04C 29/04 418/64 |
| 2018/0274662 | A1 | * | 9/2018  | Spangler ................. F16D 13/72 |

FOREIGN PATENT DOCUMENTS

JP    5020765 B2    9/2012

* cited by examiner

*Primary Examiner* — Charles A Fox
*Assistant Examiner* — Farhana Pervin
(74) *Attorney, Agent, or Firm* — Alleman Hall Creasman & Tuttle LLP

(57) ABSTRACT

A straddle vehicle includes: a prime mover; a hydraulically actuated main clutch; an oil control valve unit; a power unit case accommodating at least the main clutch; an oil pan mounted beneath the power unit case; a clutch-dedicated pump; a primary filter disposed in an oil passage between the oil pan and the clutch-dedicated pump; and a secondary filter disposed in an oil passage between the clutch-dedicated pump and the oil control valve unit. The primary filter and the secondary filter are mounted on a bottom surface of the power unit case and covered from below by the oil pan.

8 Claims, 15 Drawing Sheets

STRADDLE VEHICLE

CROSS-REFERENCE TO RELATED APPLICATION

This application claims priority to and the benefit of Japanese Patent Application No. 2019-123351, filed on Jul. 2, 2019, the entire disclosure of which is incorporated herein by reference.

BACKGROUND OF THE INVENTION

Field of the Invention

The present disclosure relates to a straddle vehicle such as a motorcycle.

Description of the Related Art

In a power unit of a vehicle such as a motorcycle, an oil is drawn from an oil pan into an oil pump, and the oil discharged from the oil pump is supplied to an oil control valve unit (clutch controller) through a primary filter and a secondary filter (see Japanese Patent No. 5020765, for example). The primary filter is placed in the oil pan mounted beneath a crankcase, and the secondary filter is disposed inside the crankcase.

In the above configuration, when maintenance operations are performed on both of the primary and secondary filters, the power unit needs to be disassembled to a sufficient extent. Thus, the efficiency of the maintenance operations is low.

SUMMARY OF THE INVENTION

A straddle vehicle according to one aspect of the present disclosure includes: a prime mover; a hydraulically actuated main clutch disposed in a power transmission route between the prime mover and a drive wheel; an oil control valve unit that controls flow of a hydraulic oil supplied to the main clutch; a power unit case accommodating at least the main clutch; an oil pan mounted beneath the power unit case and retaining an oil; a clutch-dedicated pump that sucks the oil from the oil pan and that discharges the sucked oil as the hydraulic oil toward the oil control valve unit; a primary filter disposed in an oil passage between the oil pan and the clutch-dedicated pump; and a secondary filter disposed in an oil passage between the clutch-dedicated pump and the oil control valve unit, wherein the primary filter and the secondary filter are mounted on a bottom surface of the power unit case and covered from below by the oil pan.

With the above configuration, both the primary filter and the secondary filter are made easily accessible by removing the oil pan. This improves the ease of maintenance of the two filters.

In an exemplary configuration, the power unit case and the oil pan may be shaped to form together an accommodation chamber in which the secondary filter is accommodated.

With this configuration, the accommodation chamber for the secondary filter can easily be formed by mounting the oil pan on the power unit case.

In an exemplary configuration, the straddle vehicle may further include: a prime mover-dedicated pump that sucks the oil from the oil pan and discharges the sucked oil toward the prime mover to lubricate the prime mover; and another secondary filter disposed in an oil passage between the prime mover-dedicated pump and the prime mover, and suction inlets of the clutch-dedicated pump and the prime mover-dedicated pump may communicate with the primary filter.

With this configuration, since the primary filter is used for both the clutch-dedicated pump and the engine-dedicated pump, an increase in the number of required components and an increase in size of the space required for arrangement of the components can be prevented. Additionally, since different pumps are used as the clutch-dedicated pump and the engine-dedicated pump, respectively, the hydraulic oil can be supplied quickly to the main clutch even at the start-up of the prime mover. If a single pump is used for both the clutch and the prime mover, more of the oil will be delivered toward the prime mover (the low pressure side) than toward the clutch at the start-up of the prime mover, and a long time will be required for the main clutch to become operable. With the above configuration, the time required for the main clutch to become operable can be shortened even at the start-up of the prime mover.

In an exemplary configuration, the clutch-dedicated pump and the prime mover-dedicated pump may be coaxially connected to each other.

With this configuration, the straddle vehicle can be made compact.

In an exemplary configuration, the straddle vehicle may further include: a relief valve disposed between the clutch-dedicated pump and the oil control valve unit; and a bypass passage through which the oil discharged from the relief valve is introduced into an oil passage between the primary filter and the clutch-dedicated pump without passing through the primary filter.

With this configuration, the amount of the oil sucked from the oil pan through the primary filter can be reduced, and thus the energy loss due to the passing of the oil through the primary filter can be reduced.

In an exemplary configuration, the power unit case may include an opening communicating with the oil passage between the primary filter and the clutch-dedicated pump, and the power unit case and the oil pan may be shaped to form together a communication chamber as the bypass passage, the communication chamber communicating with the relief valve and the opening.

With this configuration, the bypass passage can easily be formed by mounting the oil pan on the power unit case.

DETAILED DESCRIPTION OF THE EMBODIMENTS

Hereinafter, an embodiment will be described with reference to the drawings.

Figure 1:
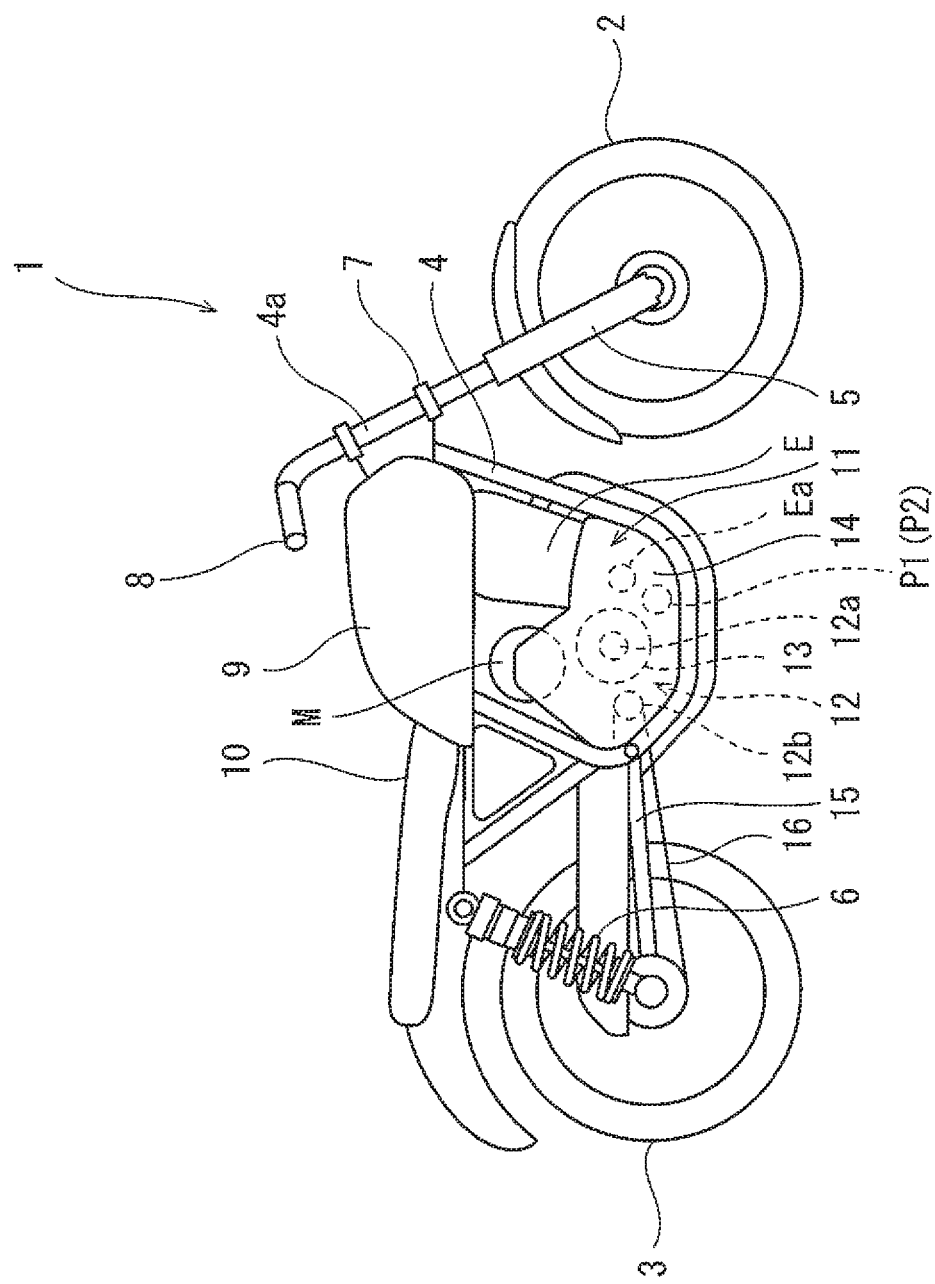
FIG. 1 is a side view of a motorcycle according to an embodiment.
Figure 2:
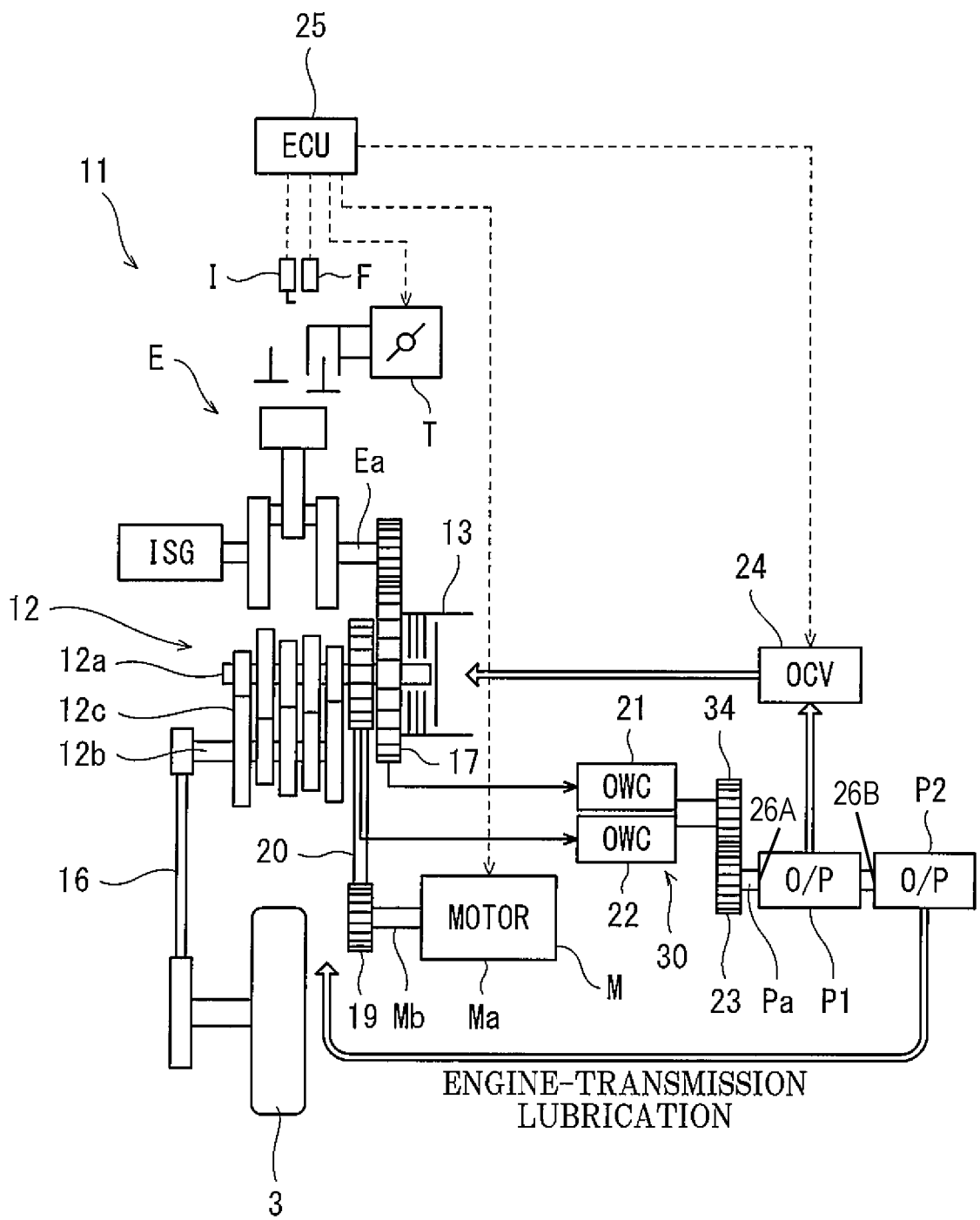
FIG. 2 is a schematic diagram of a power system of the motorcycle of FIG. 1.

FIG. 1 is a side view of a motorcycle 1 according to the embodiment. FIG. 2 is a schematic diagram of a power system of the motorcycle 1 of FIG. 1. As seen from FIG. 1, the motorcycle 1 is an example of a straddle vehicle on which the rider is seated in a straddling position. The motorcycle 1 is configured as a hybrid vehicle. The motorcycle 1 includes a front wheel 2, a rear wheel 3 (drive wheel), a vehicle body frame 4, a front suspension 5 connecting the front wheel 2 to a front portion of the vehicle body frame 4, and a rear suspension 6 connecting the rear wheel 3 to a rear portion of the vehicle body frame 4. The front suspension 5 is coupled to a bracket 7 spaced from the front suspension 5 in the upward/downward direction. A steering shaft connected to the bracket 7 is supported by a head pipe 4a constituting a part of the vehicle body frame 4, and the steering shaft is angularly movable. On the steering shaft is mounted a handle 8 to be held by the hands of the rider. A fuel tank 9 is disposed rearwardly of the handle 8, and a seat 10 on which the rider sits is disposed rearwardly of the fuel tank 9. On the vehicle body frame 4 is mounted a power unit 11 serving as a drive source for travel, and the power unit 11 is located between the front and rear wheels 2 and 3.

As shown in FIGS. 1 and 2, the power unit 11 includes an engine E and a drive motor M as prime movers. The engine E is an internal combustion engine, and the drive motor M is an electric motor. A transmission 12 is disposed rearwardly of the engine E. The transmission 12 includes an input shaft 12a, an output shaft 12b, and a plurality of gear trains 12c having different reduction ratios. The transmission 12 is configured to transmit power from the input shaft 12a to the output shaft 12b through the gear trains 12c and configured to perform speed change with a selected one of the gear trains 12c. For example, the transmission 12 is a dog clutch transmission. The engine E includes a crankshaft Ea, one end of which is connected to a primary gear 17 so as to be capable of power transmission to the primary gear 17. The other end of the crankshaft Ea is connected to an integrated starter generator ISG so as to be capable of power transmission to the integrated starter generator ISG.

The primary gear 17 is disposed around the input shaft 12a and located between the main clutch 13 and the gear trains 12c in the axial direction of the input shaft 12a. The primary gear 17 is rotatable relative to the input shaft 12a. The primary gear 17 transmits rotational power from the crankshaft Ea to the main clutch 13. The primary gear 17 is connected to the input shaft 12a of the transmission 12 via the main clutch 13 so as to be capable of power transmission to the input shaft 12a. The main clutch 13 is mounted on one end of the input shaft 12a and functions to establish and break the power transmission route from the crankshaft Ea to the input shaft 12a. The main clutch 13 is actuated by hydraulic pressure. The main clutch 13 is, for example, a multi-plate clutch.

In the vicinity of the input shaft 12a there are disposed a clutch-dedicated pump P1 and an engine-dedicated pump P2 which are mechanically linked to, and driven by, rotation of the input shaft 12a. The respective driven shafts Pa of the clutch-dedicated pump P1 and engine-dedicated pump P2 are coaxial. The crankshaft Ea of the engine E, the input and output shafts 12a and 12b of the transmission 12, the main clutch 13, the clutch-dedicated pump P1, and the engine-dedicated pump P2 are accommodated in a crankcase 14 (power unit case). The crankshaft Ea, input shaft 12a, output shaft 12b, and driven shafts Pa are parallel to one another and extend in the vehicle width direction of the motorcycle 1 (leftward/rightward direction). The vehicle body frame 4 supports a swing arm 15 supporting the rear wheel 3 and extending in the forward/rearward direction, and the swing arm 15 is angularly movable. The rotational power of the output shaft 12b of the transmission 12 is transmitted to the rear wheel 3 through an output transmission member 16 (e.g., a chain or belt).

Between the primary gear 17 and the gear trains 12c is disposed a sprocket 18 (rotary member), which is mounted around the input shaft 12a and rotates together with the input shaft 12a. The drive motor M includes a motor housing Ma and a motor drive shaft Mb projecting from the motor housing Ma, and a sprocket 19 is mounted on the motor drive shaft Mb to rotate together with the motor drive shaft Mb. Gears or pulleys may be used as the rotary members instead of the sprockets 18 and 19. A chain 20 (power transmission member) is connected to both the sprocket 18 mounted on the input shaft 12a and the sprocket 19 mounted on the motor drive shaft Mb. Thus, the drive power of the drive motor M is transmitted to the input shaft 12a through the sprocket 18. That is, the combination of the sprocket 19, chain 20, and sprocket 18 is an example of a power transmission mechanism 40 that transmits power from the motor drive shaft Mb to the input shaft 12a.

The drive power of the engine E is transmitted to a first one-way clutch 21 through the primary gear 17. The drive power of the drive motor M is transmitted to a second one-way clutch 22 through the sprocket 18. The first one-way clutch 21 and second one-way clutch 22 are connected to the driven shafts Pa of the clutch-dedicated pump P1 and engine-dedicated pump P2 via a power transmission mechanism 23 so as to be capable of power transmission to the driven shafts Pa. That is, the first one-way clutch 21 and second one-way clutch 22 constitute a pump power transmitter 30 that transmits the drive power of the engine E or drive motor M to the clutch-dedicated pump P1 and engine-dedicated pump P2.

An oil discharged from the clutch-dedicated pump P1 is supplied as a hydraulic oil to the main clutch 13 through an oil control valve unit 24. The oil control valve unit 24 opens and closes a flow passage through which the oil flows from the clutch-dedicated pump P1 to the main clutch 13. An oil discharged from the engine-dedicated pump P2 is supplied as a lubricating oil to the engine E and the transmission 12. An electronic control unit (ECU) 25 controls the engine E. Specifically, the ECU 25 controls a throttle device T, a fuel injection device F, and an ignition device I. The ECU 25 further controls engagement and disengagement of the main clutch 13 by controlling the opening and closing of the oil control valve unit 24.

Figure 3:
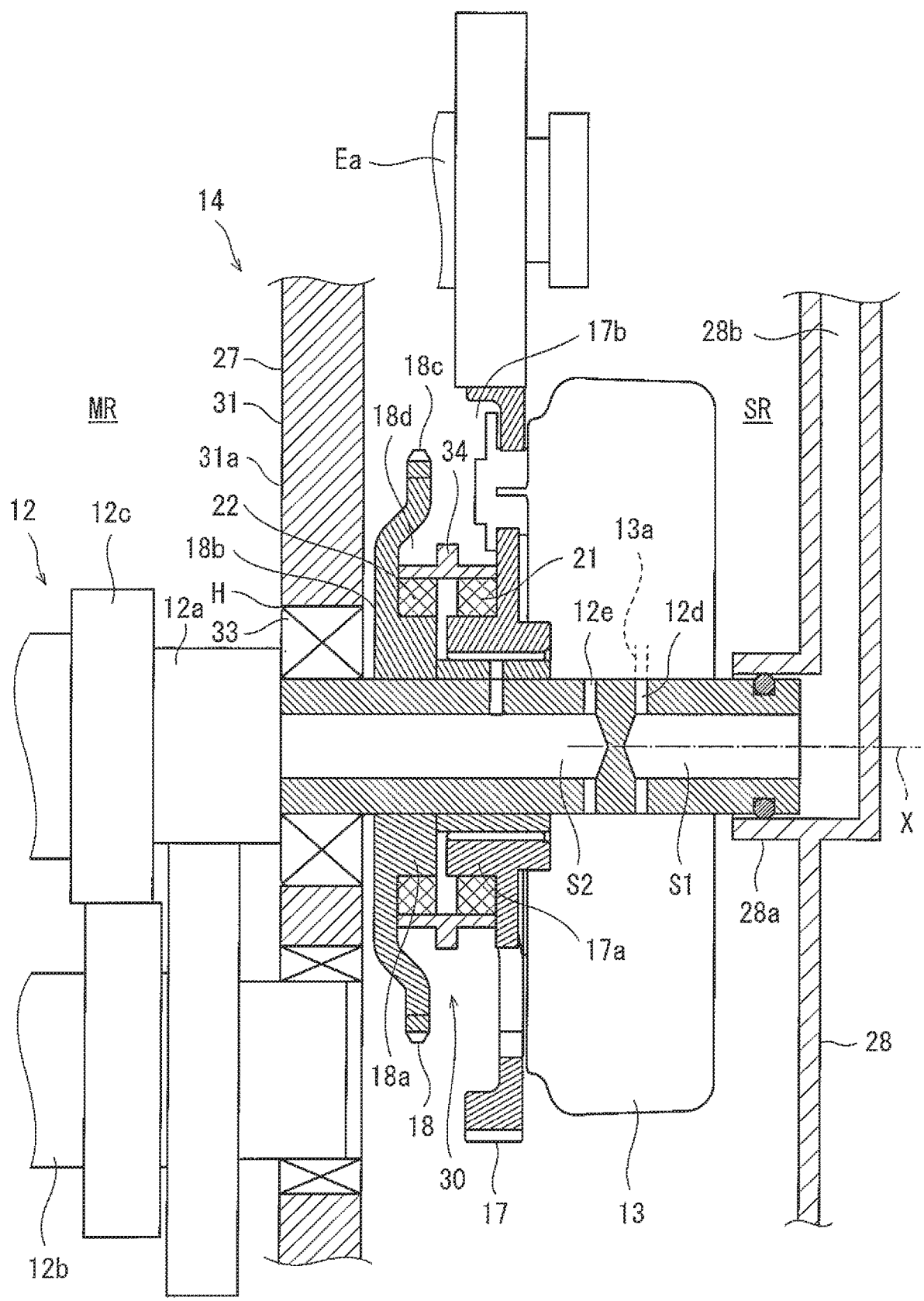
FIG. 3 is a cross-sectional view showing key components of the power unit of FIG. 2.

FIG. 3 is a cross-sectional view showing key components of the power unit 11 of FIG. 2. As shown in FIG. 3, the crankcase 14 includes: a case body 27 including a main body portion 31 and an extended portion 32 (FIG. 5) which are described in detail below; and a first cover 28 removably mounted on a lateral side of the case body 27. A second cover 29, which is described in detail below, is further mounted on the case body 27. Inside the case body 27 is formed a main chamber MR (crank chamber). The main chamber MR accommodates the crankshaft Ea and the transmission 12. The main body portion 31 of the case body 27 includes a side wall portion 31a provided with a hole H, inside which a bearing 33 is mounted. The bearing 33 rotatably supports the input shaft 12a. The side wall portion 31a is located between the primary gear 17 and the gear trains 12c.

Figure 4:
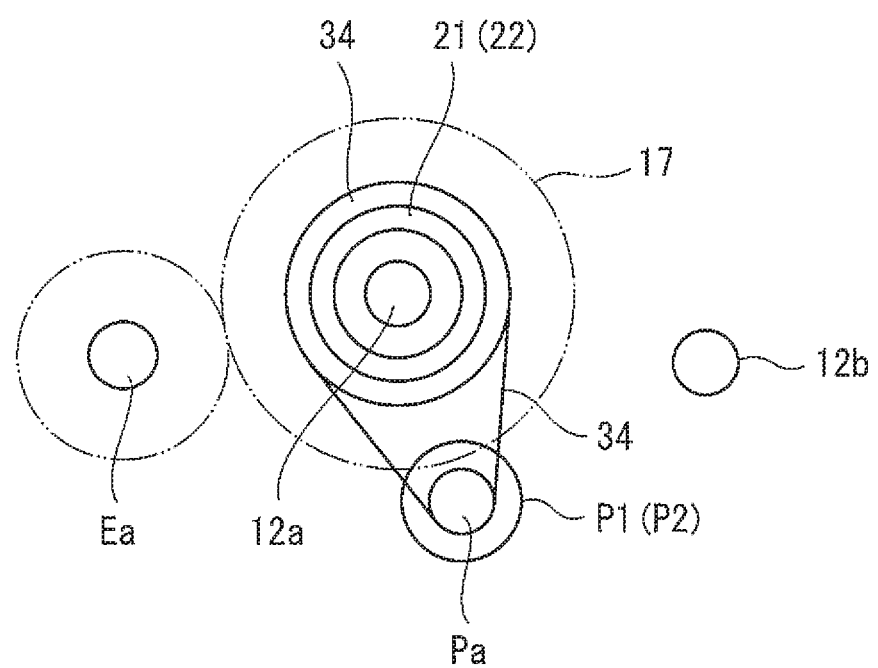
FIG. 4 is a schematic diagram of various shafts and other components of the power system of the motorcycle of FIG. 1 as viewed in the vehicle width direction.

Between the case body 27 and the first cover 28 (and the second cover 29) is formed a subsidiary chamber SR. One end of the input shaft 12a projects into the subsidiary chamber SR. Although not illustrated in FIG. 3, the driven shafts Pa (see FIG. 4) of the clutch-dedicated pump P1 and engine-dedicated pump P2 also project into the subsidiary chamber SR. The subsidiary chamber SR accommodates one end of the crankshaft Ea, the one end of the input shaft 12a, the main clutch 13, the primary gear 17, the pump power transmitter 30, and the driven shafts Pa of the oil pumps P1 and P2.

The main clutch 13 includes an outer case (not illustrated), an inner case (not illustrated), and a multi-plate unit (not illustrated). When the multi-plate unit is brought into a pressed state, the inner case becomes unable to rotate relative to the outer case, and a clutch-engaged state is established. When the multi-plate unit is brought into a non-pressed state, the inner case becomes able to rotate relative to the outer case, and a clutch-disengaged state is established. The outer case of the main clutch 13 is coupled to the primary gear 17 to rotate together with the primary gear 17. The inner case of the main clutch 13 is coupled to the input shaft 12a to rotate together with the input shaft 12a. The inner diameter of the primary gear 17 is larger than the outer diameter of the input shaft 12a, and the inner peripheral surface of the primary gear 17 is spaced radially outward from the outer peripheral surface of the input shaft 12a.

The input shaft 12a is hollow. Inside the input shaft 12a are formed a first flow passage S1 and a second flow passage S2 which are divided from each other. The first flow passage S1 opens to the outside at one end of the input shaft 12a, while the second flow passage S2 opens to the outside at the other end of the input shaft 12a. The input shaft 12a includes a first opening 12d through which the first flow passage S1 communicates with an inlet port 13a of the main clutch 13. The input shaft 12a includes a second opening 12e through which a lubricating oil is supplied from the second flow passage S2 to the main clutch 13. The first cover 28 includes a fitting portion 28a tightly fitted on the one end of the input shaft 12a.

In the first cover 28 is formed a hydraulic oil passage 28b communicating with the oil control valve unit 24 (see FIG. 2). The hydraulic oil passage 28b communicates with the first flow passage S1 at the inside of the fitting portion 28a. When a hydraulic pressure larger than a predetermined pressure is applied from the hydraulic oil passage 28b of the first cover 28 to the main clutch 13 through the first flow passage S1 of the input shaft 12a, the main clutch 13 is brought into an engaged state. When the hydraulic pressure transmitted from the hydraulic oil passage 28b of the first cover 28 to the main clutch 13 through the first flow passage S1 of the input shaft 12a falls below the predetermined pressure, the main clutch 13 is brought into a disengaged state.

The pump power transmitter 30 is configured to receive power transmitted from the crankshaft Ea of the engine E through the primary gear 17 and power transmitted from the drive motor M through the input shaft 12a and sprocket 18 and configured to appropriately transmit the power of the crankshaft Ea and the power of the drive motor M to the driven shafts Pa of the clutch-dedicated pump P1 and engine-dedicated pump P2. The pump power transmitter 30 includes the first one-way clutch 21, the second one-way clutch 22, and a common gear 34 (tubular member). A sprocket or pulley may be used as the tubular member instead of the common gear 34.

The sprocket 18, to which the drive power of the drive motor M is transmitted, is located closer to the gear trains 12c than is the primary gear 17. Specifically, the sprocket 18 is disposed between the primary gear 17 and the bearing 33 mounted in the side wall portion 31a of the case body 27. Thus, the chain 20 (see FIGS. 2 and 5) connected to the sprocket 18 is prevented from being located outwardly of the main clutch 13 in the vehicle width direction, and an increase in vehicle width can be prevented.

The primary gear 17 includes a tubular portion 17a projecting toward the sprocket 18 from an inner peripheral portion of the primary gear 17. The first one-way clutch 21 is fitted around the tubular portion 17a of the primary gear 17. The sprocket 18 includes: a tubular portion 18a which is an inner peripheral portion fitted around the input shaft 12a so that the sprocket 18 rotates together with the input shaft 12a; an annular plate portion 18b projecting radially outward from the tubular portion 18a; and a power receiving portion 18c which is a teeth portion disposed on the outer periphery of the annular plate portion 18b and having the chain 20 connected thereto. The tubular portion 18a projects toward the primary gear 17 from the annular plate portion 18b. The portions of the sprocket 18 need not be integrally formed; for example, the tubular portion 18a and the annular plate portion 18b may be separately formed and secured to each other.

The second one-way clutch 22 is fitted around the tubular portion 18a of the sprocket 18. The second one-way clutch 22 is located closer to the sprocket 18 than is the first one-way clutch 21. The first one-way clutch 21 and second one-way clutch 22 are disposed around the input shaft 12a and adjacent to each other in the direction of the axis X of the input shaft 12a. The rotational power of the primary gear 17 is transmitted to the first one-way clutch 21, and the rotational power of the input shaft 12a is transmitted to the second one-way clutch 22.

The first one-way clutch 21 and second one-way clutch 22 are fitted inside the common gear 34. The first one-way clutch 21 transmits power in the direction from the primary gear 17 toward the common gear 34, but does not transmit power in the direction from the common gear 34 toward the primary gear 17. The second one-way clutch 22 transmits power in the direction from the sprocket 18 toward the common gear 34, but does not transmit power in the direction from the common gear 34 toward the sprocket 18. Since the two adjacent one-way clutches 21 and 22 are fitted inside the common gear 34, an increase in the number of required components can be prevented, and a reduction of the size of the pump power transmitter 30 in the direction of the axis X can be achieved. The common gear 34 is connected to the driven shafts Pa of the clutch-dedicated pump P1 and engine-dedicated pump P2 so as to be capable of power transmission to the driven shafts Pa, and this connection is made via a gear serving as the power transmission mechanism 23.

The primary gear 17 includes a recessed portion 17b recessed toward the main clutch 13 in the direction of the axis X. The recessed portion 17b is located radially outward of, and adjacent to, the tubular portion 17a. A part of the first one-way clutch 21 and a part of the common gear 34 are placed in the recessed portion 17b. In other words, the first one-way clutch 21 and the common gear 34, as viewed in the radial direction of the primary gear 17, overlap the primary gear 17. Thus, the power system can be made compact in the vehicle width direction.

In the sprocket 18, the power receiving portion 18c is offset with respect to the annular plate portion 18b in a direction away from the side wall portion 31a; namely, the power receiving portion 18c is offset outwardly in the vehicle width direction. As such, even when the sprocket 18 is configured to have a large diameter, the side wall portion 31a of the case body 27 is unlikely to interfere with the sprocket 18. Thus, the flexibility in shape design of the case body 27 can be increased. The sprocket 18 includes a recessed portion 18d located between the tubular portion 18a and the power receiving portion 18c and recessed in a direction away from the main clutch 13 along the axis X (a direction toward the main chamber MR). The recessed portion 18d is disposed radially outward of, and adjacent to, the tubular portion 18a. A part of the second one-way clutch 22 and a part of the common gear 34 are placed in the recessed portion 18d. In other words, the second one-way clutch 22 and the common gear 34, as viewed in the radial direction of the sprocket 18, overlap the sprocket 18. Thus, the power system can be made compact in the vehicle width direction.

The sprocket 18 is larger in diameter than the gears of the gear trains 12c. The sprocket 18 is larger in diameter than the common gear 34. The sprocket 18 is disposed in the subsidiary chamber SR in which the main clutch 13 having a relatively large diameter is disposed, rather than in the main chamber MR in which the transmission 12 is disposed. Thus, even when the sprocket 18 has a large diameter, a size increase of the crankcase 14 can be prevented. Additionally, since the sprocket 18 is disposed in the subsidiary chamber SR, the sprocket 18 can be configured to have a large diameter such that the speed of rotation produced by the drive power transmitted from the drive motor M to the input shaft 12a is reduced at a sufficient reduction ratio. This can prevent a size increase of the drive motor M. Hence, in the hybrid motorcycle 1 in which the drive power of the drive motor M is transmitted to the input shaft 12a of the transmission 12, a size increase of the power system can be prevented.

Figure 5:
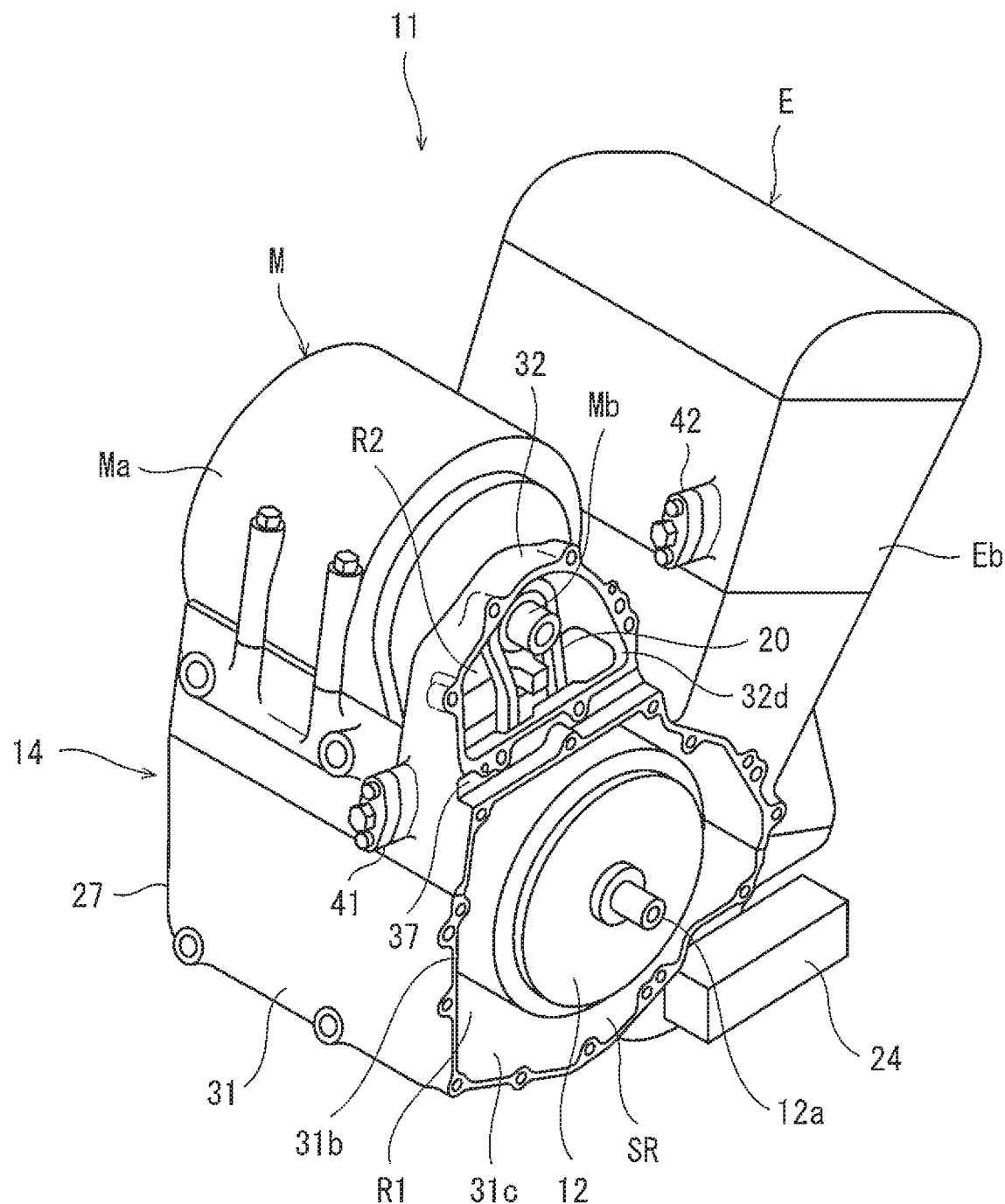
FIG. 5 is a right rear perspective view of the power unit of the motorcycle of FIG. 1 with covers removed from the power unit.
Figure 6:
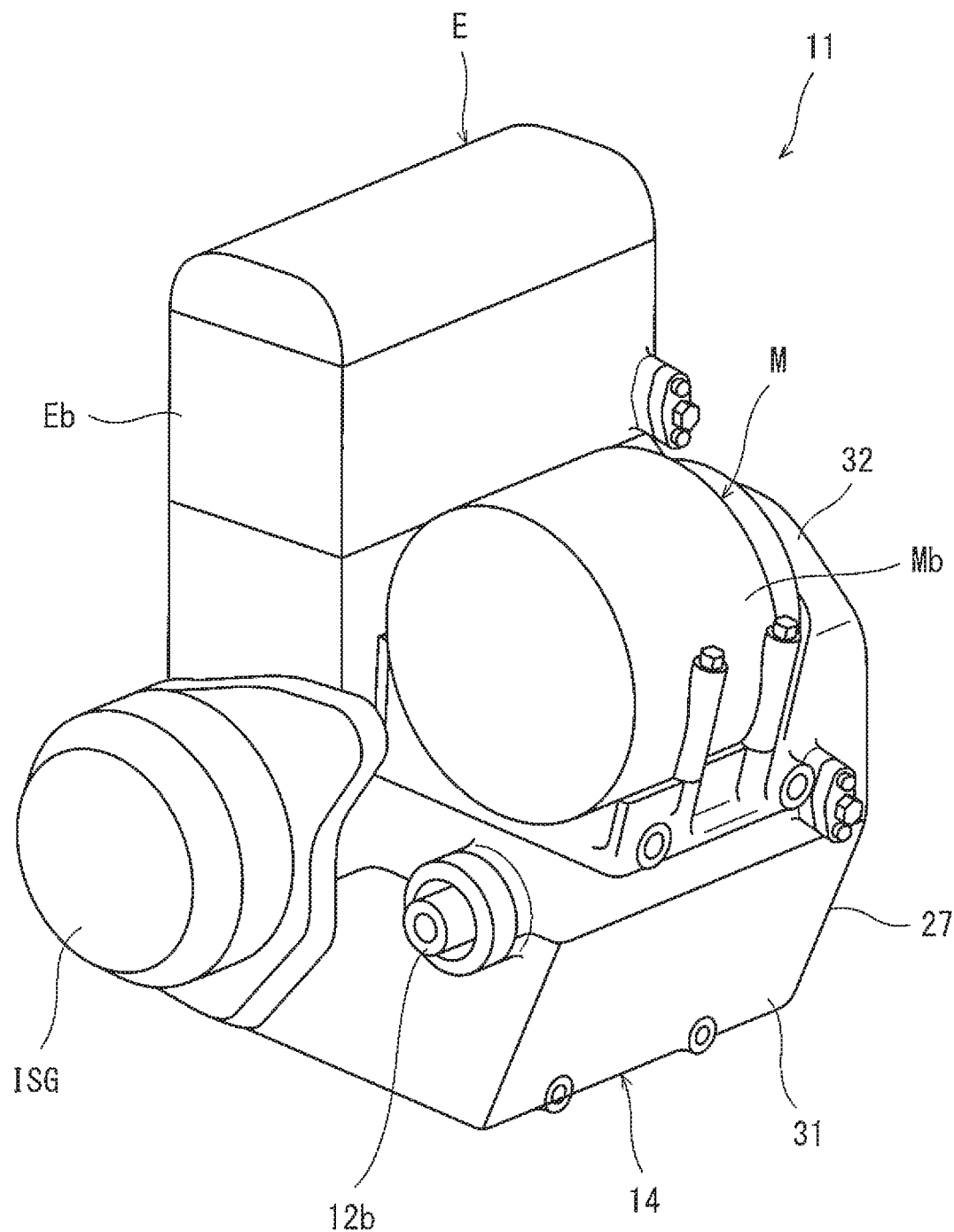
FIG. 6 is a left rear perspective view of the power unit of FIG. 5.
Figure 7:
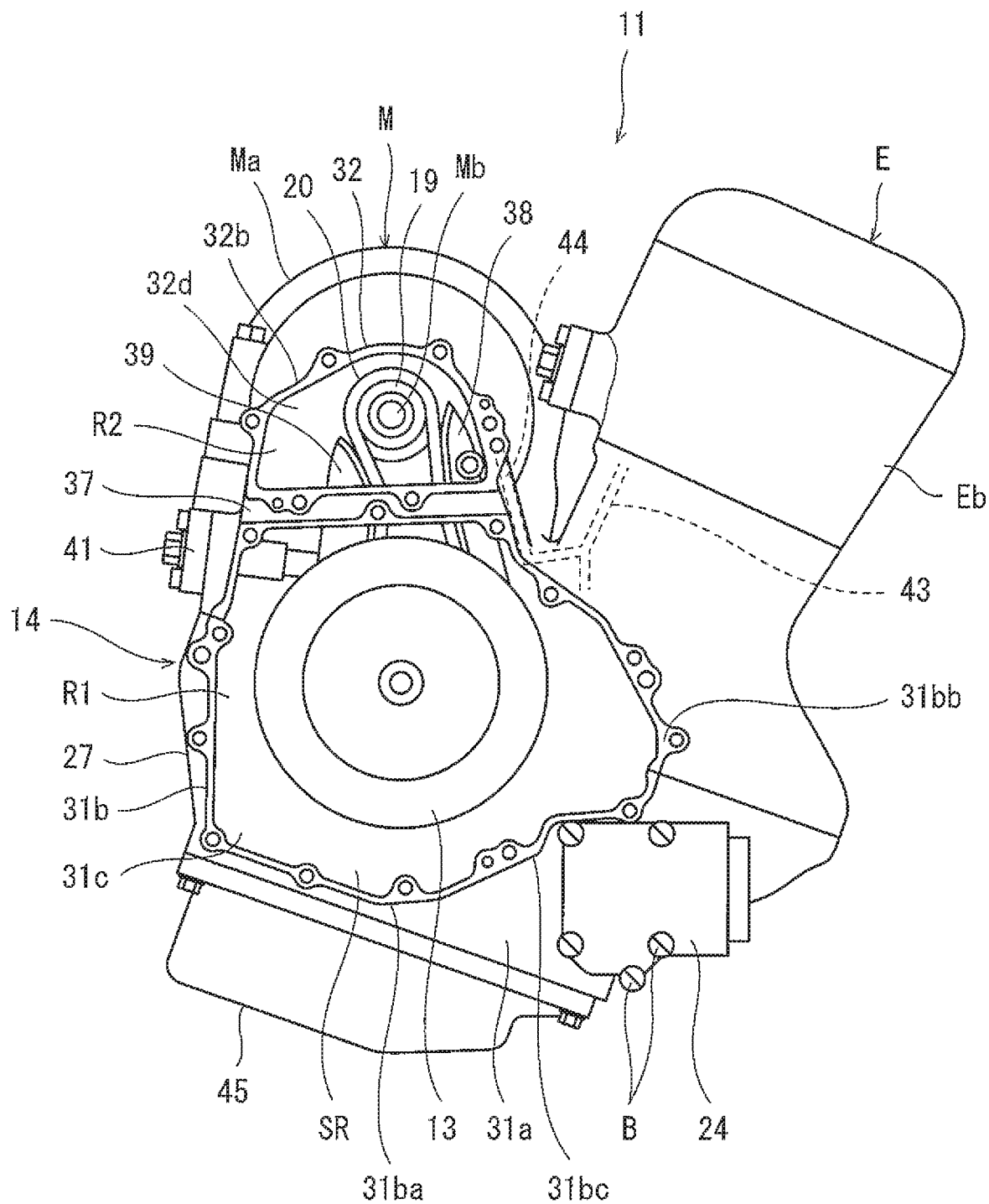
FIG. 7 is a right side view of the power unit of FIG. 5.
Figure 8:
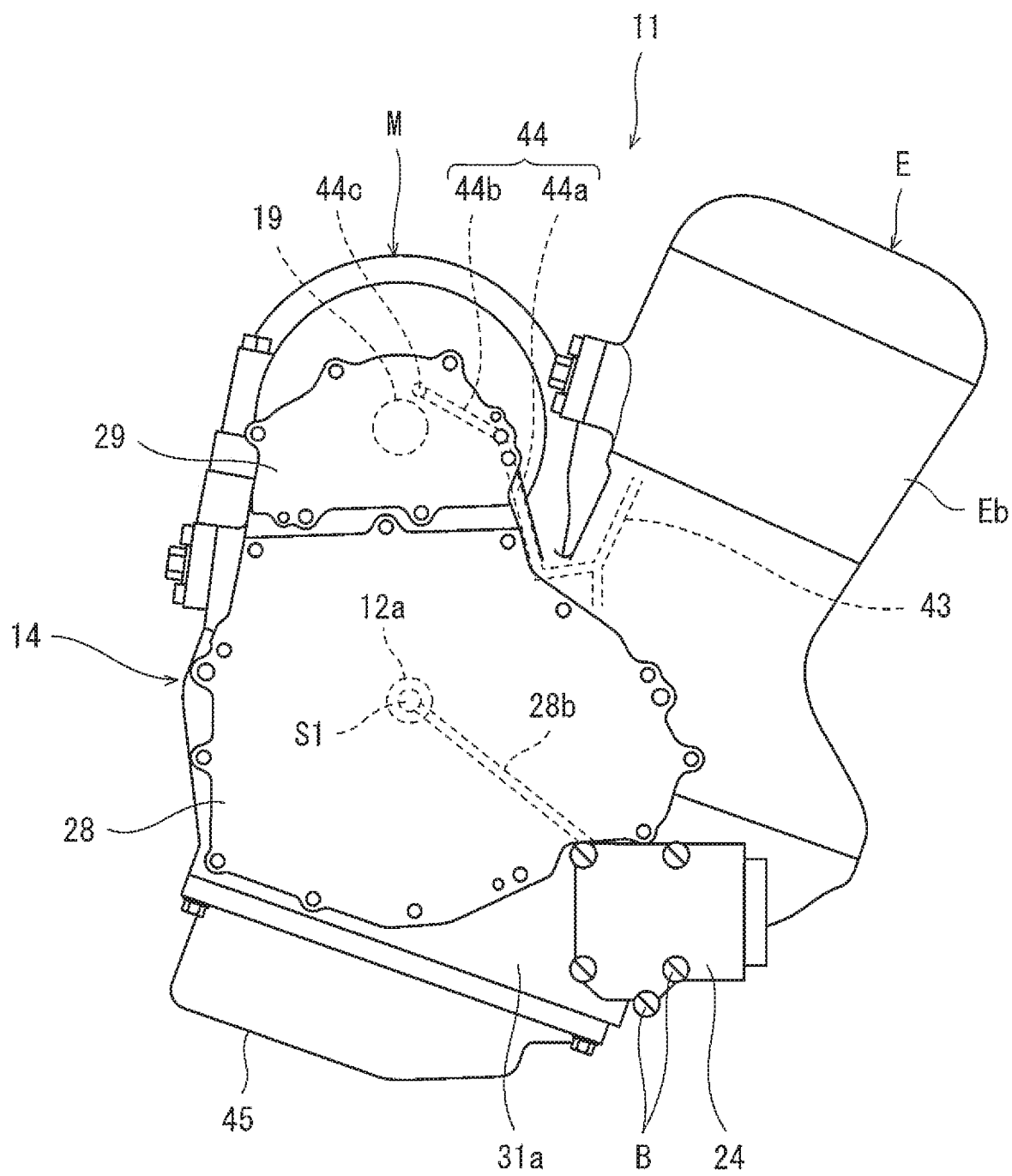
FIG. 8 is a right side view of the power unit of FIG. 7 with the covers mounted thereon.
Figure 9:
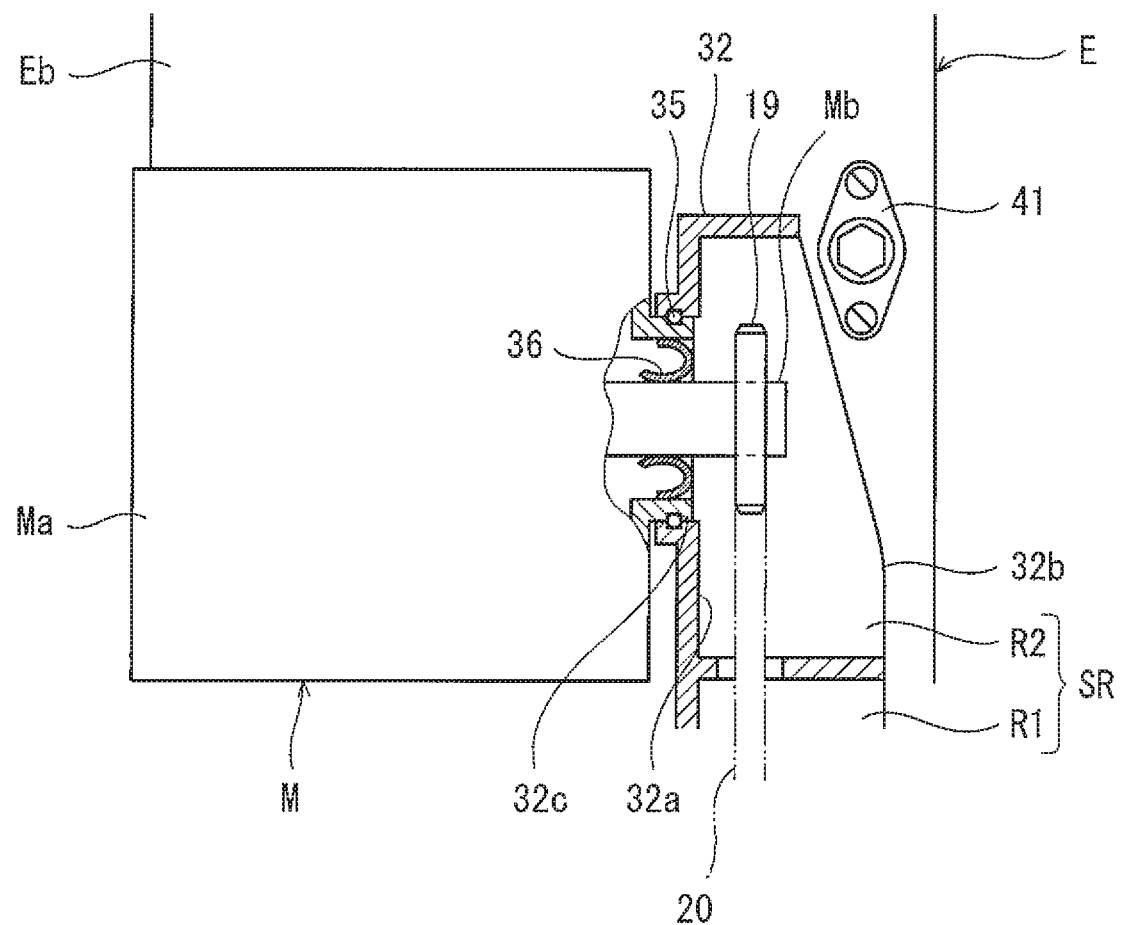
FIG. 9 is a longitudinal sectional rear view of an extended portion of a crankcase and the vicinity of the extended portion in the power unit of FIG. 5.
Figure 10:
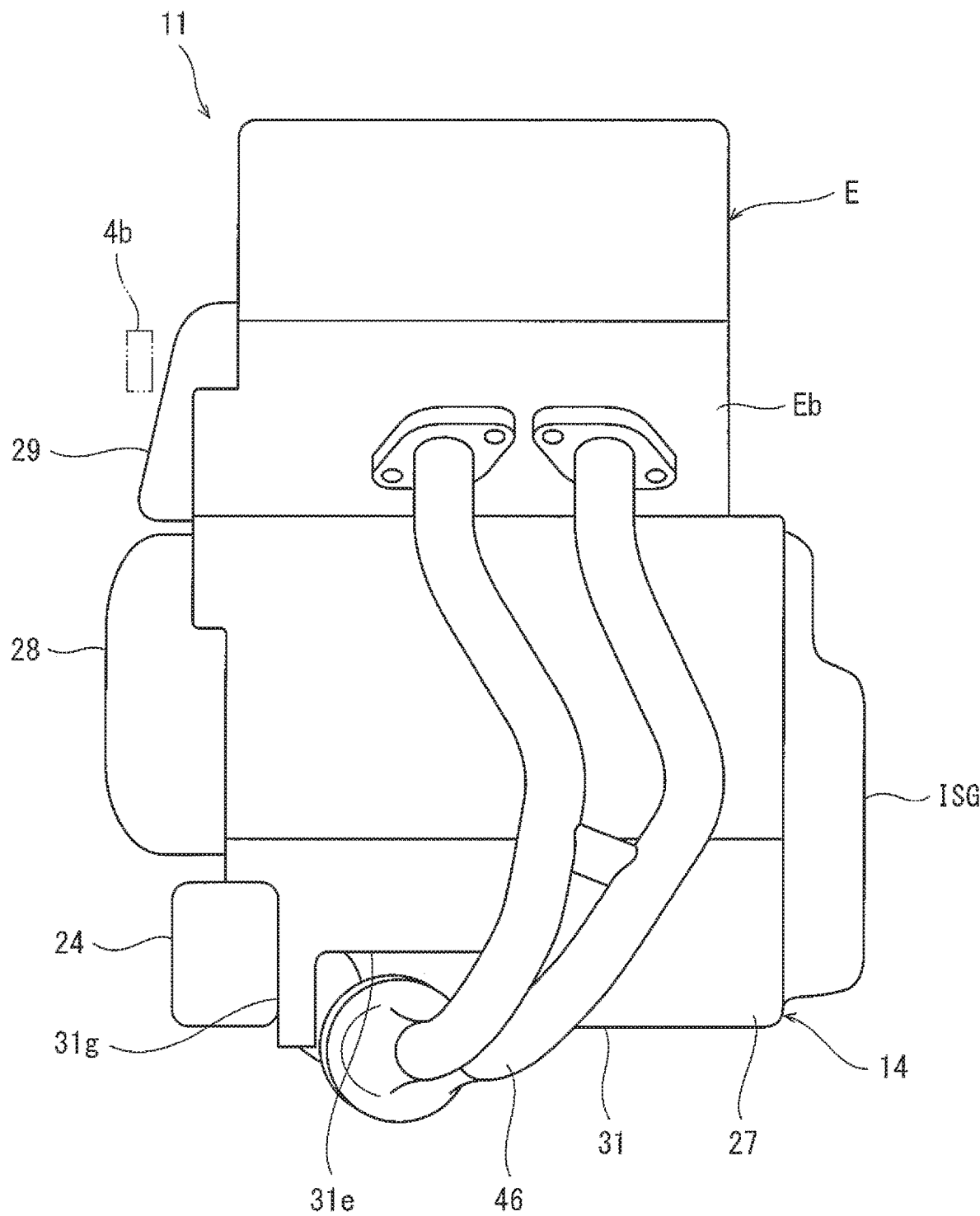
FIG. 10 is a front view of the power unit of FIG. 5 with the covers mounted thereon.

FIG. 5 is a right rear perspective view of the power unit 11 of the motorcycle 1 of FIG. 1 with the covers removed from the power unit 11. FIG. 6 is a left rear perspective view of the power unit 11 of FIG. 5. FIG. 7 is a right side view of the power unit 11 of FIG. 5. FIG. 8 is a right side view of the power unit of FIG. 7 with the covers mounted thereon. FIG. 9 is a longitudinal sectional rear view of the extended portion 32 of the crankcase 14 and the vicinity of the extended portion 32 in the power unit 11 of FIG. 5. FIG. 10 is a front view of the power unit 11 of FIG. 5 with the covers mounted thereon. As shown in FIGS. 5 to 8, the power unit 11 includes the engine E and the drive motor M. The engine E includes a cylinder Eb extending upwardly from a front portion of the crankcase 14. The crankcase 14 includes the main body portion 31 projecting rearwardly from a lower portion of the cylinder Eb. The drive motor M is disposed rearwardly of the cylinder Eb and mounted on the top surface of the main body portion 31. That is, the drive motor M is aligned with the main body portion 31 in the upward/downward direction.

The drive motor M includes the motor housing Ma which is approximately in the shape of a circular tube, and the motor drive shaft Mb projects to one side (toward the subsidiary chamber SR) in the vehicle width direction. The crankcase 14 further includes the extended portion 32 projecting upwardly from the main body portion 31 so as to be located lateral to the motor housing Ma. Thus, the extended portion 32 as viewed from the one side in the vehicle width direction overlaps the drive motor M. The upper end of the extended portion 32 is at a lower level than the upper end of the drive motor M. One end of the motor drive shaft Mb is inserted into the extended portion 32.

The case body 27 includes a frame-shaped wall portion 31b projecting outwardly (toward the main clutch 13) in the vehicle width direction from the side wall portion 31a of the main body portion 31 defining the main chamber MR. The frame-shaped wall portion 31b has an opening 31c facing outwardly in the vehicle width direction. The first cover 28 is removably secured to the outer end face of the frame-shaped wall portion 31b in the vehicle width direction so as to close the opening 31c. The extended portion 32 has an opening 32d facing outwardly in the vehicle width direction, and the second cover 29 is removably secured to the frame-shaped outer end face of the extended portion 32 in the vehicle width direction so as to close the opening 32d. The case body 27 includes a bridge portion 37 dividing the opening 31c from the opening 32d and connecting the end face of the frame-shaped wall portion 31b to the end face of a frame-shaped wall portion 32b.

A space surrounded by the side wall portion 31a, frame-shaped wall portion 31b, and first cover 28 and a space surrounded by the extended portion 32 and second cover 29 constitute the subsidiary chamber SR. The subsidiary chamber SR includes a first region R1 defined by the main body portion 31 and a second region R2 defined by the extended portion 32. The second region R2 communicates with the first region R1 in the upward/downward direction. The first cover 28 closes the first region R1 from outside in the vehicle width direction. The second cover 29 closes the second region R2 from outside in the vehicle width direction. Since the cover closing the subsidiary chamber SR is divided into the first cover 28 and second cover 29 which are separate from each other, the individual covers 28 and 29 can be prevented from having a large area even when the size of the subsidiary chamber SR is increased by the presence of the extended portion 32. Thus, noise due to vibration of the covers can be reduced.

As shown in FIG. 9, the motor housing Ma of the drive motor M includes a projecting tubular portion Mc into which the motor drive shaft Mb is inserted. The extended portion 32 of the crankcase 14 includes a side wall portion 32a facing the motor housing Ma and a frame-shaped wall portion 32b projecting outwardly in the vehicle width direction from the periphery of the side wall portion 32a and continuous with the main body portion 31. The side wall portion 32a of the extended portion 32 is provided with an insertion hole 32c. The projecting tubular portion Mc of the motor housing Ma is inserted into the insertion hole 32c. An annular sealing member 35 is interposed between the inner peripheral surface of the insertion hole 32c and the outer peripheral surface of the projecting tubular portion Mc. The motor drive shaft Mb projects outwardly in the vehicle width direction from the projecting tubular portion Mc. That is, the motor drive shaft Mb extends through the insertion hole 32c and projecting tubular portion Mc and leads to the second region R2 defined inside the extended portion 32. Thus, the motor housing Ma and the extended portion 32 are easily connected by fitting. An annular sealing member 36 is disposed in a gap between the motor drive shaft Mb and the projecting tubular portion Mc.

The sprocket 19 is located in the second region R2 of the subsidiary chamber SR and mounted on the outer end of the motor drive shaft Mb. The chain 20 wound around both the sprocket 19 mounted on the motor drive shaft Mb and the sprocket 18 mounted on the input shaft 12a is accommodated in the subsidiary chamber SR and lies partly in the second region R2 and partly in the first region R1.

Since the sprockets 18 and 19 are disposed in the subsidiary chamber SR which can be opened by removing the first and second covers 28 and 29, the work of mounting and dismounting the chain 20 on and from the sprockets 18 and 19 can easily be performed. Additionally, since the power transmission mechanism 40 which transmits drive power from the motor drive shaft Mb to the input shaft 12a is entirely accommodated in the crankcase 14, a size increase of the power system can be prevented, and lubrication of the power transmission mechanism 40 can easily be accomplished along with lubrication of the main clutch 13.

As shown in FIG. 7, the chain 20 is held between a front chain guide 38 and a rear chain guide 39 in the forward/rearward direction and guided by these guides. A chain tensioner 41 is mounted on the rear surface of the case body 27 of the crankcase 14, and the chain tensioner 41 biases the rear chain guide 39 toward the chain 20. This prevents loosening of the chain 20. On the rear surface of the cylinder Eb is mounted a chain tensioner 42 that prevents loosening of a chain (not illustrated) mechanically connecting a valve actuator (not illustrated) disposed above the cylinder Eb to the crankshaft Ea.

As shown in FIGS. 6 and 9, the end face of the frame-shaped wall portion 32b of the extended portion 32 is inclined to extend inwardly in the vehicle width direction from bottom to top. Thus, in a rear view, the chain tensioner 42 protrudes outwardly of the extended portion 32 in the vehicle width direction. As such, even when the extended portion 32 and the chain tensioner 42 are at least partly at the same location in the upward/downward direction, the chain tensioner 42 is easily accessible from the rear.

As shown in FIG. 8, the crankcase 14 includes an engine lubricating oil passage 43 through which flows a lubricating oil for lubrication of the engine E and a motor power system lubricating oil passage 44 branching from the engine lubricating oil passage 43. The motor power system lubricating oil passage 44 is formed in the extended portion 32. In particular, the motor power system lubricating oil passage 44 is formed partly in the case body 27 and partly in the second cover 29. The motor power system lubricating oil passage 44 includes an upstream passage 44a formed in the frame-shaped wall portion 32b of the extended portion 32 and a downstream passage 44b formed in the second cover 29 and communicating with the upstream passage 44a. The upstream passage 44a and downstream passage 44b communicate at a contact plane between the respective end faces of the frame-shaped wall portion 32b and second cover 29.

The second cover 29 includes a discharge outlet 44c through which the lubricating oil flowing in the downstream passage 44b is discharged into the second region R2. Through the discharge outlet 44c, the oil is ejected toward meshing portions of the sprocket 19 and chain 20. In this configuration, part of the lubricating oil flowing through the engine lubricating oil passage 43 for lubrication of the engine can be used for lubrication of the sprocket 19 and chain 20 in the second region R2. Thus, the lubrication structure can be simplified. Additionally, since the lubricating oil is discharged from the second cover 29 rather than from the case body 27, the flexibility in setting the location of discharge of the lubricating oil is increased. Beneath the crankcase 14 is mounted an oil pan 45 retaining the oil falling from the main chamber MR and the subsidiary chamber SR.

As shown in FIGS. 5, 7, 8, and 10, the oil control valve unit 24 which controls flow of the hydraulic oil supplied to the main clutch 13 is secured to the case body 27 of the crankcase 14. Since the oil control valve unit 24 is secured to the case body 27 rather than to the first cover 28, the oil control valve unit 24 does not obstruct the work of mounting and dismounting the first cover 28, and the efficiency of maintenance operations is improved. Additionally, since the oil control valve unit 24 is secured to the case body 27 rather than to the vehicle body frame 4, the hydraulic oil passage from the oil control valve unit 24 to the main clutch 13 can be shortened. In particular, the oil control valve unit 24 is secured to a lower front portion of the case body 27. As such, interference of the oil control valve unit 24 with other components can be avoided, and the oil control valve unit 24 can be disposed in a compact manner. The oil control valve unit 24 has an elongated shape and extends longitudinally in the forward/rearward direction. Thus, the power system can be made compact in the vehicle width direction.

As seen from FIG. 7, when the power unit is viewed in the vehicle width direction, the upper end of the oil control valve unit 24 is located above the lower end of the case body 27, and the rear end of the oil control valve unit 24 is located rearwardly of the front end of the case body 27. This provides a reduction in the length over which the oil control valve unit 24 as viewed in the vehicle width direction projects from the case body 27. The frame-shaped wall portion 31b of the main body portion 31 of the case body 27 includes a lower edge portion 31ba, a front edge portion 31bb, and an inclined portion 31bc extending obliquely forward and upward from the lower edge portion 31ba to the front edge portion 31bb. The side wall portion 31a of the main body portion 31 has a mounting surface 31g (see FIG. 10) located forwardly of and below the inclined portion 31c when viewed in the vehicle width direction.

As shown in FIG. 10, the mounting surface 31g is located inwardly of the outer end face of the frame-shaped wall portion 31b in the vehicle width direction. The oil control valve unit 24 is secured to the mounting surface 31g. The rear end portion of the oil control valve unit 24 is at the same location in the vehicle width direction as the subsidiary chamber SR. The outer end of the oil control valve unit 24 in the vehicle width direction is located inwardly of the outer end of the crankcase 14 in the vehicle width direction. Thus, the length over which the oil control valve unit 24 projects from the crankcase 14 is so small that the power unit 11 can be made compact and that when the vehicle overturns, the contact of the oil control valve unit 24 with the ground can be reduced. The oil control valve unit 24 is secured to the mounting surface 31g by fastening fastener elements B onto the mounting surface 31g from outside to inside in the vehicle width direction. As such, mounting and dismounting of the oil control valve unit 24 can easily be performed by access from outside in the vehicle width direction.

As shown in FIGS. 3, 7, and 8, the main clutch 13 includes the inlet port 13*a* into which the hydraulic oil is supplied. The first cover 28 includes the hydraulic oil passage 28*b* into which flows the oil coming out of the oil control valve unit 24. The oil coming out of the oil control valve unit 24 flows in the hydraulic oil passage 28*b* of the first cover 28 and passes through the first flow passage S1 of the input shaft 12*a* to enter the inlet port 13*a* of the main clutch 13. Thus, the hydraulic oil passage from the oil control valve unit 24 to the main clutch 13 can be formed with a small number of components. The flow outlet of the oil control valve unit 24 and the flow inlet of the hydraulic oil passage 28*b* may be directly connected to each other, may be connected via a flow passage formed in the main body portion 31, or may be connected via a tube.

As shown in FIG. 10, the second cover 29 is located inwardly of the first cover 28 in the vehicle width direction. Thus, the size of the crankcase 14 is effectively reduced to allow another component (such as a portion 4*b* of the vehicle body frame 4) to be disposed in a space outward of the second cover 29 in the vehicle width direction. An increase in vehicle width can therefore be prevented. The bottom surface of the main body portion 31 of the case body 27, as viewed from the front, is provided with a recessed portion 31*e* recessed upwardly. An exhaust pipe 46 connected to an exhaust port of the cylinder Eb passes through the recessed portion 31*e* from front to rear.

Figure 11:
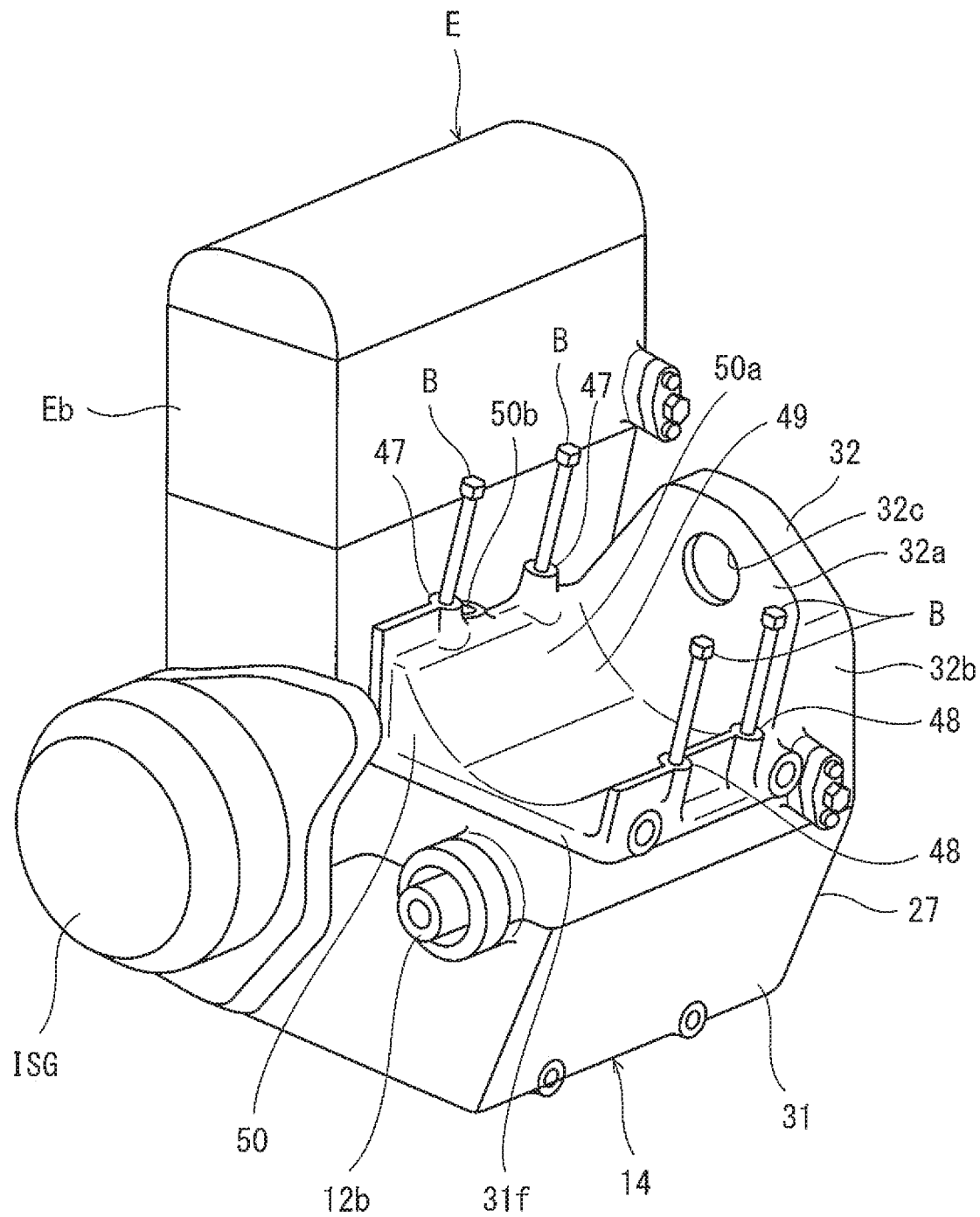
FIG. 11 is a perspective view of the power unit of FIG. 6 with a drive motor removed therefrom.
Figure 12:
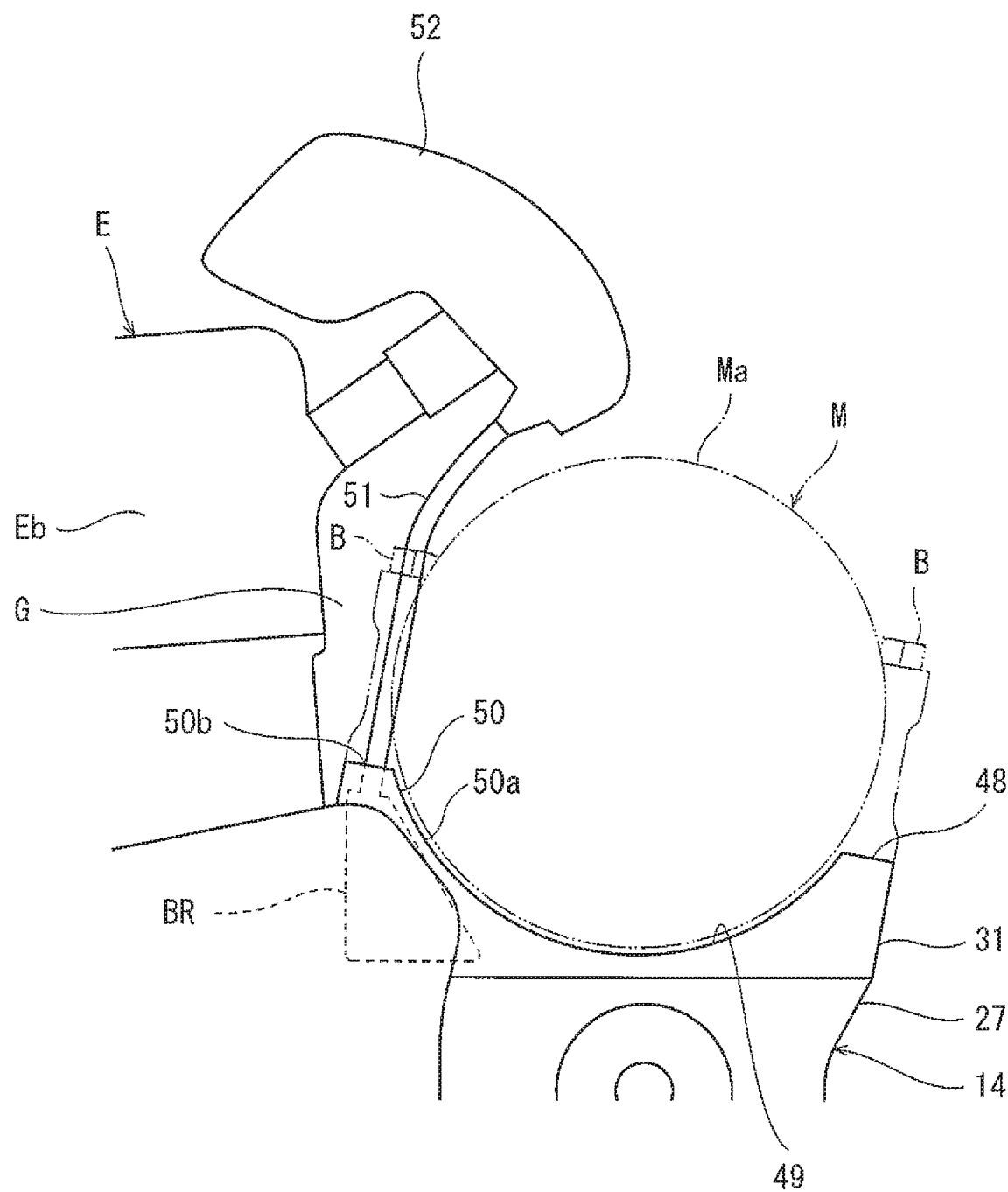
FIG. 12 is an enlarged left side view of the drive motor and its vicinity in the power unit of the FIG. 6.

FIG. 11 is a perspective view of the power unit 11 of FIG. 6 with the drive motor M removed therefrom. FIG. 12 is an enlarged left side view of the drive motor M and its vicinity in the power unit 11 of FIG. 6. As shown in FIGS. 11 and 12, the main body portion 31 of the crankcase 14 includes an upper wall portion 31*f*, and the upper wall portion 31*f* includes front mount portions 47, rear mount portions 48, and a case top surface 49. Each of the front and rear mount portions 47 and 48 is, for example, a base provided with a bolt hole, and projects upwardly from the upper wall portion 31*f* of the main body portion 31. The front of the motor housing Ma is secured to the front mount portions 47 from above by fastener elements B. The rear of the motor housing Ma is secured to the rear mount portions 48 from above by fastener elements B. That is, the electric motor M is supported by the front and rear mount portions 47 and 48 of the crankcase 14.

The case top surface 49 is formed between the front mount portions 47 and the rear mount portions 48 and has a circular arc shape conforming to the outer peripheral surface of the motor housing Ma. The motor housing Ma is located in proximity to the case top surface 49 and slightly spaced from the case top surface 49. The drive motor M is disposed in such a manner that a lower portion of the motor housing Ma is held between the front mount portions 47 and the rear mount portions 48. As such, the drive motor M can be stably supported by the crankcase 14.

The case body 27 of the crankcase 14 includes a breather portion 50 projecting upwardly from the main body portion 31 accommodating the crankshaft Ea and the transmission 12. The breather portion 50 defines a breather chamber BR into which blowby gas is introduced from the main chamber MR. For example, the breather chamber BR has a labyrinth structure and separates oil mist coming from the main chamber MR into air and oil. The breather portion 50 is formed between the front of the case top surface 49 and the main body portion 31 by making use of the circular arc shape of the case top surface 49 which is downwardly recessed.

In particular, the breather portion 50 has a facing surface 50*a* facing the outer peripheral surface of the motor housing Ma, and the facing surface 50*a* as viewed in the vehicle width direction has a circular arc shape. In other words, the facing surface 50*a* of the breather portion 50 constitutes a part of the case top surface 49. The drive motor M is disposed rearwardly of the cylinder Eb of the engine E and separated from the cylinder Eb by a gap G. The breather portion 50 is disposed in the gap G and located rearwardly of the cylinder Eb and forwardly of the drive motor M. The front mount portions 47 are spaced rearwardly from the cylinder Eb of the engine E.

With this configuration, the breather portion 50 can be efficiently arranged even though the drive motor M is disposed rearwardly of the cylinder Eb of the engine E and mounted on the top surface of the crankcase 14. As such, the engine E, the crankcase 14, and the drive motor M can be closely arranged, and a size reduction of the motorcycle 1 can be achieved. Additionally, heat transfer from the cylinder Eb to the drive motor M can be reduced. Further, since the cylinder Eb and the front mount portions 47 are independent of each other, a process such as machining can easily be performed.

The top portion of the breather portion 50 is provided with a connection port 50*b* to which a breather tube 51 is connected. The connection port 50*b* is at the same location in the forward/rearward direction as the front mount portions 47. Specifically, the front mount portions 47 (two front mount portions 47 in FIG. 11) are aligned in the vehicle width direction. The connection port 50*b* is disposed between the pair of front mount portions 47 spaced from each other in the vehicle width direction. To the connection port 50*b* is connected one end of the breather tube 51. The other end of the breather tube 51 is connected to an air cleaner box 52 disposed above the drive motor. The air cleaner box 52 forms an intake passage for introduction of intake air into the cylinder Eb and purifies the intake air. The blowby gas from which the oil has been separated in the breather chamber BR is delivered into the air cleaner box 52 through the breather tube 51.

The breather tube 51 extends upwardly from the breather portion 50 and passes through the gap G toward the air cleaner box 52. Thus, the breather tube 51 can be efficiently arranged by making use of the gap G between the cylinder Eb of the engine E and the drive motor M, and the space efficiency is therefore increased. Additionally, since the connection port 50*b* is at the same location in the forward/rearward direction as the front mount portions 47 spaced rearwardly from the cylinder Eb, the breather tube 51 can easily be attached to the connection port 50*b* while the breather tube 51 is maximally spaced from the cylinder Eb.

Figure 13:
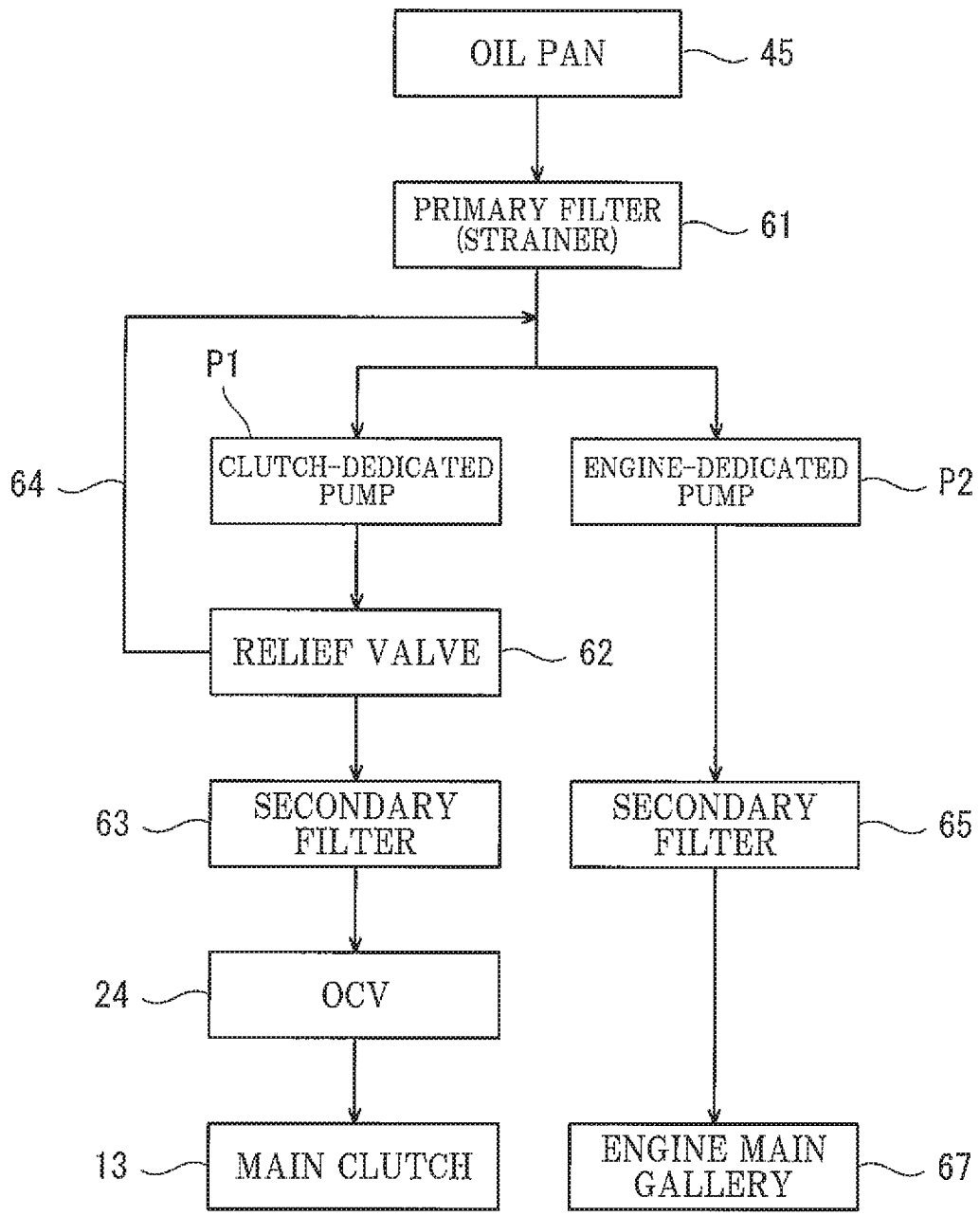
FIG. 13 is a block diagram illustrating an oil passage of the power unit of FIG. 5.

FIG. 13 is a block diagram illustrating the oil passage of the power unit 11 of FIG. 5. As shown in FIG. 13, the oil retained in the oil pan 45 is sucked to a strainer 60 under the action of sucking pressures generated by the clutch-dedicated pump P1 and engine-dedicated pump P2, and the sucked oil is filtered through a primary filter 61 attached to the strainer 60 and drawn into the clutch-dedicated pump P1 and engine-dedicated pump P2.

The oil discharged from the clutch-dedicated pump P1 passes through a relief valve 62, then is filtered through a secondary filter 63, and reaches the oil control valve unit 24. Once the pressure of the oil flowing from the clutch-dedicated pump P1 to the oil control valve unit 24 exceeds a predetermined relief pressure, the relief valve 62 operates to discharge the oil into a bypass passage 64. The bypass passage 64 communicates with a flow passage between the primary filter 61 and the clutch-dedicated pump P1 (and the engine-dedicated pump P2).

When the flow outlet of the oil control valve unit 24 is closed, the relief valve 62 is brought into a relief state once the hydraulic pressure applied to the relief valve 62 exceeds the relief pressure. While the relief valve 62 is in the relief state, the oil delivered from the clutch-dedicated pump P1 is discharged from the relief valve 62 into the bypass passage 64 and returned to a point upstream of the clutch-dedicated pump P1 (and the engine-dedicated pump P2). In this manner, the amount of the oil sucked from the oil pan 45 through the primary filter 61 can be reduced, and thus the energy loss due to the passing of the oil through the primary filter 61 can be reduced.

Once the flow outlet of the oil control valve unit 24 is opened, the relief valve 62 is brought into a normal state, where the oil delivered from the clutch-dedicated pump P1 passes through the relief valve 62, then is filtered through the secondary filter 63, and supplied as the hydraulic oil to the main clutch 13 (in particular its inlet port 13a) through the oil control valve unit 24. The oil discharged from the engine-dedicated pump P2 is filtered through a secondary filter 65 and supplied to a main gallery 67 in the engine lubricating oil passage 43 of the engine E.

Since the primary filter 61 is used for both the clutch-dedicated pump P1 and the engine-dedicated pump P2, an increase in the number of required components and an increase in size of the space required for arrangement of the components can be prevented. Additionally, since the clutch-dedicated pump P1 and the engine-dedicated pump P2 are independent of each other and are not used for the same purpose, the hydraulic oil can, even at the start-up of the engine E, be supplied quickly to the main clutch 13 before the main gallery 67 is filled with the oil. As such, the time required for the main clutch 13 to become operable can be shortened even at the start-up of the engine E.

Figure 14:
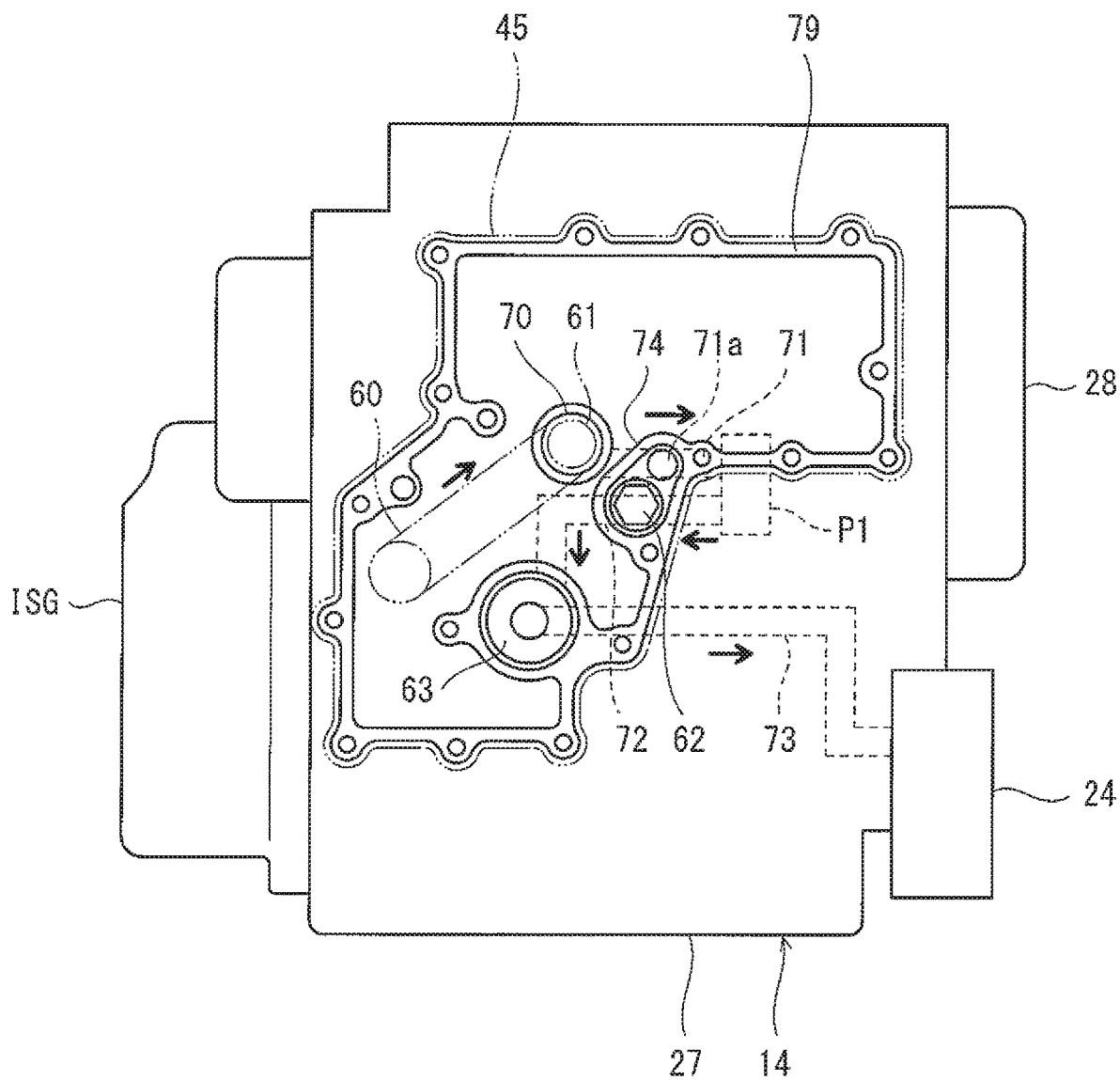
FIG. 14 is a bottom view of the power unit of FIG. 8.

FIG. 14 is a bottom view of the power unit 11 of FIG. 8. As shown in FIG. 14, a frame-shaped mounting seat 79 on which the oil pan 45 is mounted is disposed on the bottom surface of the crankcase 14 (in particular its case body 27). The frame-shaped mounting seat 79 surrounds a region of the bottom surface of the crankcase 14, and the strainer 60 with the primary filter 61 attached thereto and the secondary filter 63 are disposed in the region surrounded by the mounting seat 79 and are covered from below by the oil pan 45. With the oil pan 45 removed from the mounting seat, the strainer 60 and the secondary filter 63 as viewed from below are exposed to the outside. Thus, both the primary filter 61 and the secondary filter 63 are made easily accessible by removing the oil pan 45. This improves the ease of maintenance of the two filters 61 and 63.

The strainer 60 is connected to a flow inlet 70 opening at the bottom surface of the crankcase 14. The oil sucked to the strainer 60 and filtered through the primary filter 61 flows into the flow inlet 70. The crankcase 14 includes a first flow passage 71 in which the oil entering the crankcase 14 through the flow inlet 70 flows toward the suction inlet 26a of the clutch-dedicated pump P1 (and the suction inlet 26b of the engine-dedicated pump P2). The crankcase 14 includes a second flow passage 72 in which the oil discharged from the clutch-dedicated pump P1 flows toward the secondary filter 63. The second flow passage 72 includes a portion located close to the first flow passage 71 and extending parallel to the first flow passage 71. The crankcase 14 includes a third flow passage 73 in which the oil filtered through the secondary filter 63 flows toward the flow inlet of the oil control valve unit 24.

Figure 15:
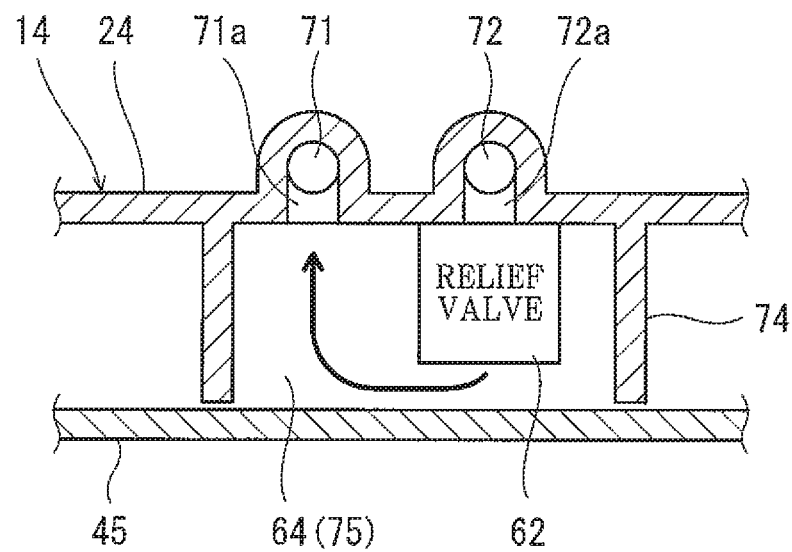
FIG. 15 is a longitudinal sectional view of a bypass passage in the oil passage of the power unit of FIG. 14.

FIG. 15 is a longitudinal sectional view of the bypass passage 64 in the oil passage of the power unit 11 of FIG. 14. As shown in FIGS. 14 and 15, the bottom surface of the crankcase 14 is provided with an opening 71a communicating with the first flow passage 71 between the primary filter 61 and the clutch-dedicated pump P1 and facing toward the oil pan 45. The bottom surface of the crankcase 14 is further provided with an opening 72a communicating with the second flow passage 72 between the clutch-dedicated pump P1 and the secondary filter 63 and facing toward the oil pan 45, and the relief valve 62 is connected to the opening 72a. The opening 72a is formed in that portion of the second flow passage 72 which is located close to the first flow passage 71 and extends parallel to the first flow passage 71.

The bottom surface of the crankcase 14 is provided with a surrounding wall portion 74 which, as viewed from below, projects downwardly to surround both the opening 71a and the relief valve 62. The lower edge of the surrounding wall portion 74 faces the oil pan 45. The bottom surface of the crankcase 14, the inner peripheral surface of the surrounding wall portion 74 of the crankcase 14, and the top surface of the oil pan 45 define a communication chamber 75. While the relief valve 62 is in the relief state, the oil discharged from the relief valve 62 is returned to the first flow passage 71 through the communication chamber 75 and the opening 71a. That is, the communication chamber 75 serves the function of the bypass passage 64.

In this configuration, the bypass passage 64 can easily be formed by mounting the oil pan 45 on the crankcase 14. A sealing member may be disposed between the lower end face of the surrounding wall portion 74 and the oil pan 45. The surrounding wall portion 74 may be configured to project from the oil pan 45 rather than from the crankcase 14 or may be configured to have opposing portions which project from the crankcase 14 and the oil pan 45, respectively.

Figure 16:
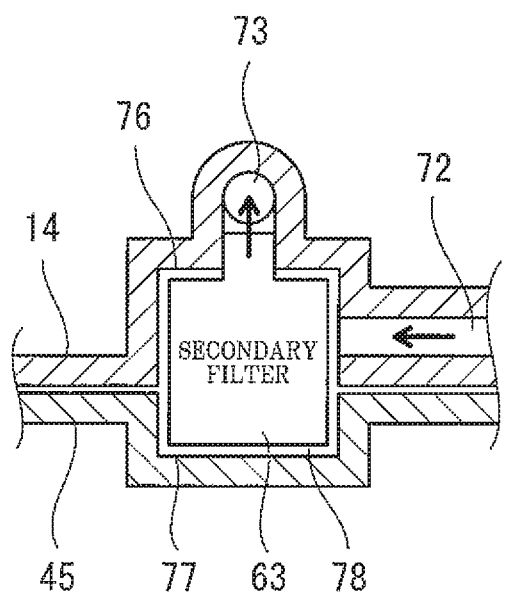
FIG. 16 is a longitudinal sectional view of a secondary filter and its vicinity in the power unit of FIG. 14.

FIG. 16 is a longitudinal sectional view of the secondary filter 63 and its vicinity in the power unit 11 of FIG. 14. As shown in FIGS. 14 and 16, the bottom surface of the crankcase 14 (in particular its case body 27) is provided with a recessed portion 76 recessed upwardly. The second flow passage 72 opens into the recessed portion 76, and the third flow passage 73 also opens into the recessed portion 76. Thus, the second flow passage 72 communicates with the third flow passage 73 through the recessed portion 76.

The top surface of the oil pan 45 is provided with a recessed portion 77 recessed downwardly. With the oil pan 45 mounted on the crankcase 14, the recessed portion 76 and the recessed portion 77 are combined to form an accommodation chamber 78. The secondary filter 63 is accommodated in the accommodation chamber 78. The accommodation chamber 78 for the secondary filter 63 can easily be formed merely by mounting the oil pan 45 on the crankcase 14. The oil pan 45 need not necessarily be provided with the recessed portion 77 as long as the crankcase 14 and the oil pan 45 are shaped to form together the accommodation chamber 78.

The present invention is not limited to the embodiment described above, and modifications, additions, or omissions can be made to the configuration of the above embodiment. For example, while in the above embodiment the clutch-dedicated pump P1 and the engine-dedicated pump P2 are mechanical pumps driven by power of the engine E, at least one of the clutch-dedicated pump P1 and the engine-dedicated pump P2 may be an electrically-driven pump. While in the above embodiment the crankcase is presented as an example of the power unit case, a case accommodating the drive motor may serve as the power unit case when the vehicle does not include the engine E but only the drive motor as a prime mover. While in the above embodiment the two covers, namely the first cover 28 and second cover 29, are provided as the covers closing the subsidiary chamber SR, a single large cover may be used to close the entire subsidiary chamber SR. The straddle vehicle is not limited to motorcycles but may be another type of vehicle such as a motor tricycle.

What is claimed is:

1. A straddle vehicle comprising:
a prime mover;
a hydraulically actuated main clutch disposed in a power transmission route between the prime mover and a drive wheel;
an oil control valve unit that controls flow of a hydraulic oil supplied to the main clutch;
a power unit case that includes a case body and a case cover and accommodates at least the main clutch in a chamber formed between the case body and the cover;
an oil pan mounted beneath the case body of the power unit case and retaining an oil;
a clutch-dedicated pump that sucks the oil from the oil pan and that discharges the sucked oil as the hydraulic oil toward the oil control valve unit;
a primary filter disposed in an oil passage between the oil pan and the clutch-dedicated pump; and
a secondary filter disposed in an oil passage between the clutch-dedicated pump and the oil control valve unit, wherein
the primary filter and the secondary filter are mounted on a mounting surface on a bottom surface of the case body of the power unit case and covered from below by the oil pan.

2. The straddle vehicle according to claim 1, wherein the case body of the power unit case and the oil pan are shaped to form together an accommodation chamber in which the secondary filter is accommodated.

3. The straddle vehicle according to claim 1, further comprising:
a prime mover-dedicated pump that sucks the oil from the oil pan and discharges the sucked oil toward the prime mover to lubricate the prime mover; and
another secondary filter disposed in an oil passage between the prime mover-dedicated pump and the prime mover, wherein
suction inlets of the clutch-dedicated pump and the prime mover-dedicated pump communicate with the primary filter.

4. The straddle vehicle according to claim 3, wherein the clutch-dedicated pump and the prime mover-dedicated pump are coaxially connected to each other.

5. The straddle vehicle according to claim 1, further comprising:
a relief valve disposed between the clutch-dedicated pump and the oil control valve unit; and
a bypass passage through which the oil discharged from the relief valve is introduced into an oil passage between the primary filter and the clutch-dedicated pump without passing through the primary filter.

6. The straddle vehicle according to claim 5, wherein
the case body of the power unit case comprises an opening communicating with the oil passage between the primary filter and the clutch-dedicated pump, and
the case body of the power unit case and the oil pan are shaped to form together a communication chamber as the bypass passage, the communication chamber communicating with the relief valve and the opening.

7. The straddle vehicle according to claim 1, wherein with the oil pan removed, the primary filter and the secondary filter are exposed as viewed from below.

8. A straddle vehicle comprising:
a prime mover;
a hydraulically actuated main clutch disposed in a power transmission route between the prime mover and a drive wheel;
an oil control valve unit that controls flow of a hydraulic oil supplied to the main clutch;
a power unit case that includes a case body and a cover and accommodates at least the main clutch in a chamber formed between the case body and the cover;
an oil pan mounted beneath the case body of the power unit case and retaining an oil;
a clutch-dedicated pump that sucks the oil from the oil pan and that discharges the sucked oil as the hydraulic oil toward the oil control valve unit;
a primary filter disposed in an oil passage between the oil pan and the clutch-dedicated pump; and
a secondary filter disposed in an oil passage between the clutch-dedicated pump and the oil control valve unit, wherein
the primary filter and the secondary filter are mounted on a bottom surface of the case body of the power unit case and covered from below by the oil pan,
the case body of the power unit case and the oil pan are shaped to form together an accommodation chamber in which the secondary filter is accommodated,
the bottom surface of the case body is provided with a first recessed portion recessed upwardly,
a top surface of the oil pan is provided with a second recessed portion recessed downwardly, and
the first recessed portion and the second recessed portion form the accommodation chamber.

* * * * *